United States Patent
Gaskins et al.

(10) Patent No.: US 6,285,951 B1
(45) Date of Patent: Sep. 4, 2001

(54) DYNAMIC TRAFFIC BASED ROUTING ALGORITHM

(75) Inventors: Robert Gaskins, Littleton, MA (US); Thomas Mariano, Londonderry, NH (US); Mary Ellen Sparrow, Andover, MA (US)

(73) Assignee: PRI Automation, Inc., Billerica, MA (US)

( * ) Notice: Subject to any disclaimer, the term of this patent is extended or adjusted under 35 U.S.C. 154(b) by 0 days.

(21) Appl. No.: 09/608,470

(22) Filed: Jun. 30, 2000

Related U.S. Application Data

(60) Provisional application No. 60/142,227, filed on Jul. 2, 1999.

(51) Int. Cl.$^7$ .................................................. G09B 29/10
(52) U.S. Cl. .................... 701/209; 701/200; 340/992; 73/178 R
(58) Field of Search .................................. 701/209, 200; 73/178 R; 340/992

(56) References Cited

U.S. PATENT DOCUMENTS

| | | | |
|---|---|---|---|
| 5,283,739 | 2/1994 | Summerville et al. | 364/424.02 |
| 6,078,865 | * | 6/2000 | Koyanagi ............... 701/211 |

* cited by examiner

Primary Examiner—William A. Cuchlinski, Jr.
Assistant Examiner—Olga Hernandez
(74) Attorney, Agent, or Firm—Weingarten, Schurgin, Gagnebin & Hayes LLp

(57) ABSTRACT

A method and system is disclosed for dynamically routing a material transport vehicle using traffic based parameters. A controller directed to allocate a material transport vehicle to a particular node, selects the material transport vehicle that is physically closest to the particular node. The controller calculates an optimal route by identifying the possible routes between the initial node of the material transport vehicle and the destination node, and analyzing each of the nodes within each identified route according to a metric function by calculating a metric function value for each identified route. The controller then selects the route for the material transport vehicle having the smallest metric function value. The metric function may include parameters associated with each of the nodes in the material transport system including a node-to-node distance parameter, a node crossing parameter, and the number of material transport vehicles in a queue at each node within the route. In one embodiment, the metric function is given by $$M = \sum_{i=1}^{N} [L_i + D_i(1 + V_i)].$$

8 Claims, 3 Drawing Sheets

200

| Internal node —206 | Destination node —204 | Node-to-node length —202 |
|---|---|---|
| 104 | 102 | 100 |
| 104 | 106 | 50 |
| 104 | 118 | 40 |
| 106 | 104 | 50 |
| 106 | 116 | 70 |
| 106 | 108 | 35 |
| 108 | 110 | 150 |
| 108 | 106 | 35 |
| 108 | 112 | 70 |

| Node —304 | Crossing Valve —302 |
|---|---|
| 104 | 16 |
| 106 | 32 |
| 108 | 16 |
| 112 | 16 |
| 116 | 32 |

DYNAMIC TRAFFIC BASED ROUTING ALGORITHM

CROSS REFERENCE TO RELATED APPLICATIONS

Applicant claims priority under 35 U.S.C. Section 119(e) to U.S. Provisional Application Serial No. 60/142,227 filed Jul. 2, 1999, entitled: "DYNAMIC ROUTING ALGORITHM".

STATEMENT REGARDING FEDERALLY SPONSORED RESEARCH OR DEVELOPMENT

N/A

BACKGROUND OF THE INVENTION

Electrically powered vehicles are often used in manufacturing and warehouse environments for transporting and manipulating articles of manufacture. Such vehicles are desirable in such environments due to their clean operation and low noise. Often such vehicles are propelled along a fixed rail or track, allowing precise control of movement along a predetermined path.

In particular, computer controlled materials transport systems are known for moving materials among various work stations of a facility. Such systems are employed, as an example, in semiconductor fabrication facilities for moving semiconductor wafers to successive work stations. In such a wafer transport system, a monorail track is routed past the work stations and a plurality of electric vehicles are mounted on the track and moveable therealong for delivering wafers to successive work stations and for removing wafers therefrom after requisite processing operations have been accomplished. The track is composed of interconnected track sections that usually include one or more routing sections or modules that are operative to provide plural paths along the track. In general a node is a location where a vehicle is stopped, loaded, unloaded, or redirected. Thus, a node can be a workstation that a vehicle must pass through or an intersection of one or more tracks where the vehicle may be redirected.

The vehicles on the track can operate in two modes—connected or semi-independent. In connected operation, a central controller, usually a computer, assigns destinations to vehicles and monitors operation of the whole system even when the vehicles are not at a station.

In the past, the central controller has assigned a route to a vehicle based on a static routing algorithm that typically attempts to find the vehicle having the minimum distance from the destination node. This distance may include a static penalty referred to as a "node crossing value" for each node that the vehicle must pass through on the route to the destination node. However, the static routing algorithms are unable to adjust to exigent circumstances that may exist within the materials transport systems such as traffic congestion and other delays due to equipment. In addition, many computer controlled materials transport systems have at least two levels, or zones. These different levels or zones often have a limited capability for transporting vehicles therebetween. For example, in a two level system the two levels may be connected by a single vertical switch, which due to its height and speed may create an area of traffic congestion.

It would therefore be desirable to be able to compute a vehicle route using a dynamic routing algorithm that is able to respond to exigent circumstances within the materials transport system and that is able to minimize the vehicle traffic between different levels or zones.

BRIEF SUMMARY OF THE INVENTION

In accordance with the present invention, a method and system is disclosed for dynamically routing a material transport vehicle using traffic based parameters. A controller is directed to allocate a material transport vehicle to a particular node, and the controller selects the material transport vehicle that is physically closest to the particular node. The controller identifies the possible routes between the initial node of the material transport vehicle and the destination node. The controller analyzes each of the nodes within each identified route according to a metric function, and selects the route for the material transport vehicle having the smallest metric function value. The metric function may include data associated with each of the nodes in the material transport system including a node-to-node distance parameter, a node crossing parameter, and the number of material transport vehicles in a queue at each node within the route. In one embodiment, the metric function is:

$$M = \sum_{i=1}^{N} [L_i + D_i(1 + V_i)].$$

BRIEF DESCRIPTION OF THE SEVERAL VIEWS OF THE DRAWING

The invention will be more fully understood from the following detailed description taken in conjunction with the accompanying drawings in which:

FIG. 2 is a table containing exemplary output length data;

FIG. 3 is a table containing exemplary node crossing data;

DETAILED DESCRIPTION OF THE INVENTION

Figure 1:
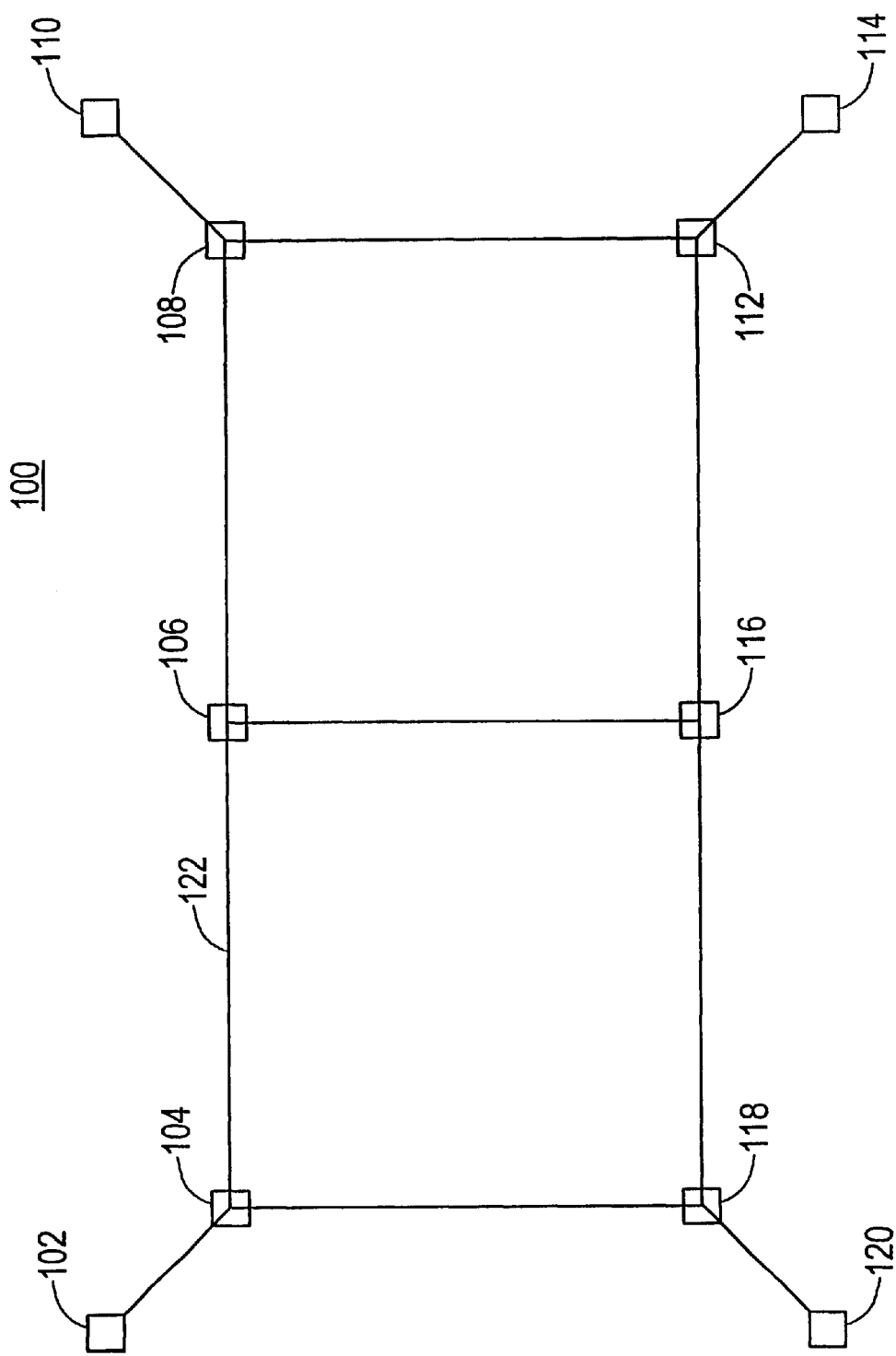
FIG. 1 is a schematic topological layout of an exemplary material transport system.

A method in accordance with the present invention for selecting an optimum route out of a plurality of routes according to a given metric function is disclosed. FIG. 1 illustrates an exemplary topology 100 of a material transport system (MTS) in which ten nodes are interconnected by a track 122. As illustrated in FIG. 1 for example, node 104 is connected to nodes 102, 106, and 118. Also as illustrated in FIG. 1 multiple routes are available for a material transport vehicle (MTV) to use in retrieving material from a node or transporting material to another node. For example, to travel from node 102 to node 120 some of the possible paths are: nodes 102-104-118-120; nodes 102-104-106-116-118-120; nodes 102-104-106-108-112-116-118-120. As used herein an "initial node" location is the position of the MTV before being commanded to proceed to another node referred to as the "destination node". In the above example, the initial node is node 102 and the destination node is node 120. The topology illustrated in FIG. 1 is an arbitrary topology intended to be for illustrative purposes only and in no way is meant to be limiting.

Figure 5:
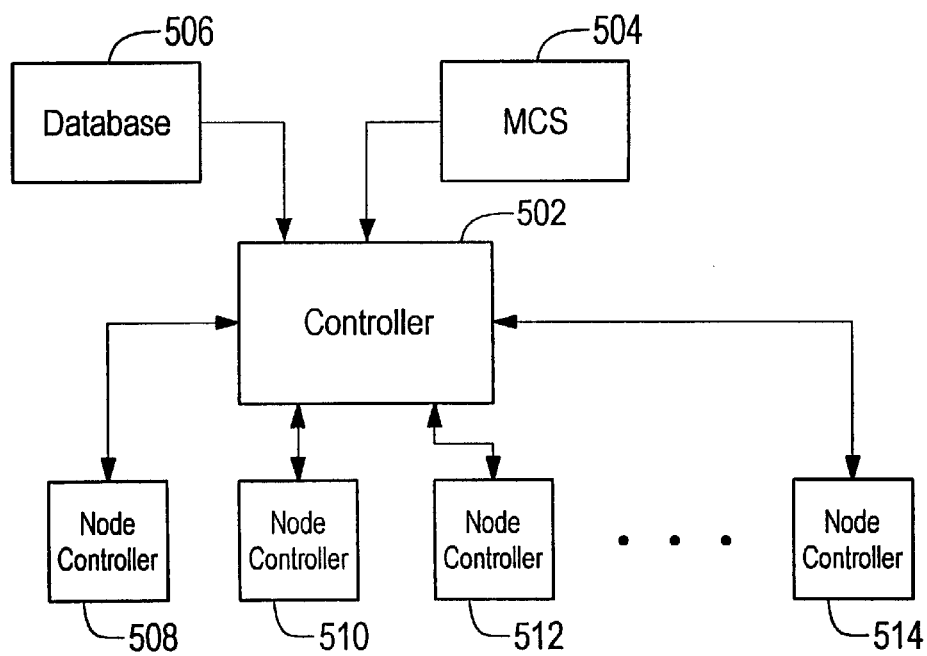
FIG. 5 is a block diagram of a dynamic traffic based routing system operative in a manner consistent with the present invention.

As illustrated in FIG. 5 a material control system (MCS) 504, which coordinates the movement of material within the MTS, can direct the controller 502 to provide a MTV to a particular destination node. The controller 502 is operative to select a free MTV and to move the MTV to the particular destination node selected by the MCS 504. As will be explained in greater detail below, in a preferred embodiment the controller 502 selects the MTV that is closest to the particular node and then determines the optimal route for the MTV to use. In addition, the MTS includes a plurality of node controllers 508, 510, 512, and 514. Although only four node controllers are shown, it should be recognized that there would be an individual node controller corresponding to each individual node. The node controllers are responsible for controlling the MTV traffic through their associated node under the supervisory control of the controller 502. As a MTV approaches an input station (not shown) of a node controller, the node controller issues commands to the MTV to reduce its speed, to stop, or to proceed. In addition, the node controller receives data from each MTV that at least identifies the MTV. The node controller communicates this MTV identity information to the controller 502. In this way the controller 502 ascertains and stores the location of each MTV within the MTS. As each MTV exits the output station (not shown) of a node, the MTV provides a signal to the node controller indicating that the node is now clear. The MTS also includes a database 506 coupled to the controller 502 that stores the topology of the MTS and other data associated with each of the nodes.

Using the topology of the MTS stored in database 506, the controller 502 identifies a plurality of routes that exist for the MTV to take between the initial node and the destination node. For each of the plurality of paths identified by the controller, the controller identifies the nodes included in a particular path, and orders the nodes in the sequence in which the MTV will pass through them, beginning with the initial node and ending with the destination node. This ordered list of nodes for each of the plurality of routes will be analyzed according to a predetermined metric function. The controller 502 will select the route that has the smallest value of the predetermined metric function among the identified routes.

The predetermined metric function is designed to qualify and quantify some aspect of the route between the initial node and the destination node. The metric function is used to calculate a value that is indicative of the quality of a particular route relative to other identified routes. The quality represented by the metric function does not have to be based on a physical parameter. Thus, the metric function may, or may not, use one or more physical parameters such as distance, time, or energy as the measure of the quality of a particular path.

As discussed above, the database 506 also contains data corresponding to each node that can be used as parameters in the metric function. As illustrated in FIG. 2 table 200, which can be stored within database 506, includes an initial node field 206, a destination node field 204 and a node-to-node distance field 202. As illustrated in FIG. 2 exemplary data has been included corresponding to the network layout in FIG. 1. For example, initial node 104 to destination node 102 is a node-to-node distance of 100.

As illustrated in FIG. 3, the database 506 also can contain crossing value data corresponding to each node in the MTV. The crossing value data may be a unitless data that may be used as a parameter in the metric function in calculating the metric function value for a particular route. The crossing value may represent the time necessary to cross the node, the distance that the MTV could have traveled in the time it took to cross the node, or other suitable user selected criteria.

In one embodiment, the metric function may be a measure of the distance between the two nodes. In this embodiment, the controller adds up the distance, hereinafter the "node-to-node distance" between each pair of consecutive nodes identified by the controller. For example if the route was 102-104-106-108-110, the metric would be the (node-to-node distance of 102-104)+(node-to-node distance of 104-106)+(node-to-node distance of 106-108)+(node-to-node distance of 108-110). This would be repeated for every route between node 102 and node 110. However, as described above this is a static metric and will be unable to respond to exigent circumstances in the MTS.

In another embodiment, the metric function may also include the node crossing value described above. In this embodiment, the metric function value may not be analogous to a physical aspect of the route because the node crossing value may be either the time or the distance between each node that is used. Since each MTV will travel at a constant velocity and every MTV will travel at substantially the same speed, the node-to-node distance and the node crossing value may be scaled appropriately for the metric equation. Thus, the metric is a unitless quantity describing the system and a suitable metric equation is:

$$M = \sum_{i=1}^{NJ} (L_i + D_i)$$

where M is the metric value for the route, N is the number of nodes on the route, $L_i$ is the node-to-node distance from node i to the i+1 node, and $D_i$ is the node crossing value for node i.

In one preferred embodiment, the metric function is a function that also includes parameters representative of exigent circumstances occurring within the MTS caused by delays due to traffic or congestion at a particular node. Congestion at a particular node will negatively affect the movement of an MTV through that node. Therefore, a metric function that takes into account the traffic congestion at each node will provide a more accurate metric function value.

As discussed above, the controller 502 receives location data for each MTV from the node controllers. The controller 502 uses this location data to identify the number of MTV vehicles that are currently waiting in the queue space of each node. A particular node that has a plurality of MTV's in the queue space associated with the particular node will increase the metric value for any path that passes through that node. Thus, the queue data should be used to more accurately calculate the metric for any path that passes through that node. In this particular embodiment, the metric function is:

$$M = \sum_{i=1}^{N} [L_i + D_i(1 + V_i)]$$

Where M is the metric for the route, N is the number of nodes on the route, $L_i$ is the node-to-node distance from node i to the i+1 node, $D_i$ is the node crossing value for node i, and $V_i$ is the number of vehicles currently in the queue space associated with node i. In one embodiment, the route selected is not updated as the MTV travels the route and passes through intermediate nodes. In a preferred embodiment, at each intermediate node having multiple outputs, such as a turnstile or a vertical switch, the controller will select a new route based on the current traffic congestion and node queue information. In this embodiment, the controller at the intermediate nodes will again determine all possible routes for the MTV between the intermediate node and the destination and calculate the metric function for each route, and will select the route with the smallest metric function value.

Figure 4:
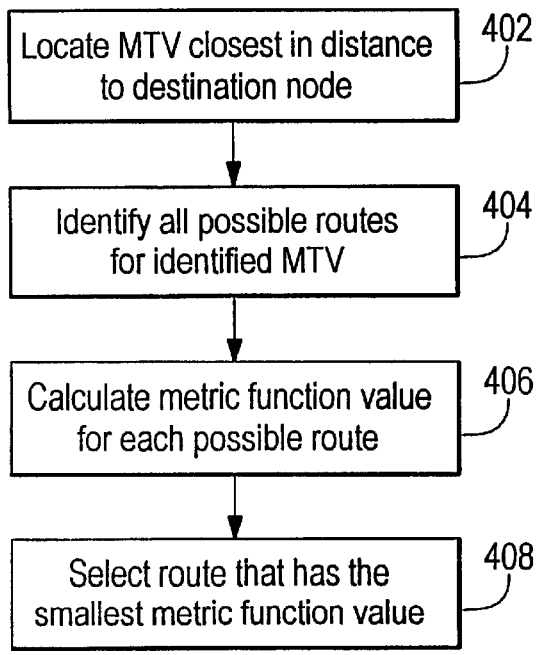
FIG. 4 is a flow diagram illustrating an exemplary method of operation for dynamically routing a material transportation vehicle.

Therefore, when the controller 502 receives a command from the MCS 504 to allocate a MTV at a particular node, the controller 502 is operative to carry out the steps of the method illustrated in FIG. 4. The controller selects the MTV that is physically closest to the particular node as illustrated in step 402. Alternatively, the controller may select the MTV that has the smallest metric function value among all available MTV's. The controller identifies all possible routes between the initial node and the destination node, as illustrated in step 404. The controller calculates the metric function value for each of the identified routes, as illustrated in step 406. The controller selects the route for the MTV to travel between the initial node and the destination node as the route having the smallest calculated metric function value based on the selected metric function, as illustrated in step 408.

In addition to allocating an MTV based on which MTV has the minimum metric function described above, other allocation criteria may be applied. As discussed above, a wafer fabrication plant may have multiple levels or zones, where the ability to transport an MTV between two levels or zones is limited and more time consuming than travel within a zone. Thus, the minimizing the number of MTV transfers between levels or zones will reduce the time and latency of the system. One heuristic rule that may be applied to the allocation of an MTV is that if there is a queue of unfilled move tasks within one zone or level when an MTV on that level or zone becomes free, the free MTV will not be allocated to a move task on a different zone or level.

Those skilled in the art should readily appreciate that computer programs operative to perform the functions herein described can be delivered to the controller 502 in many forms including, but not limited to: (a) information permanently stored in a non-readable storage media (e.g. Read Only Memory Device) devices within a computer such as a ROM or CD-ROM disks readable by a computer I/O Attachment; (b) information alterably stored on a readable storage media (e.g. floppy disks, tapes, read-write optical media and hard drives); or (c) information conveyed to a computer through a communication media, for example, using baseband or broad band signaling techniques, such as over computer or telephone networks via a modem. Alternatively, the presently described functions may be embodied in whole or in part using hardware components such as Application Specific Integrated Circuits (ASIC), state machines, programmed logic devices, controllers or other hardware components or other devices, or a combination of hardware components and software processes without departing from the inventive concepts herein described.

Those of ordinary skill in the art should further appreciate that variations to and modification of the above-described methods and apparatus for dynamically routing a MTV based on traffic based parameters may be made without departing from the inventive concepts disclosed herein. Accordingly, the invention should be viewed as limited solely by the scope spirit of the appended claims.

What is claimed is:

1. A method for selecting one of a plurality of vehicle routes for a vehicle in a materials transport system from a initial location to a destination location and passing through at least one intermediate node in the materials transport system, the method comprising the steps of:

(a) determining for each of the plurality of routes each of the intermediate nodes and the order of the intermediate nodes;

(b) receiving for each pair of consecutive nodes for each of the plurality of routes a predetermined output length for each pair of consecutive intermediate nodes;

(c) receiving for each node for each of the plurality of routes, a predetermined node crossing value;

(d) receiving for each node for each of the plurality of routes, the size of the queue of vehicles at each node for each of the plurality of routes;

(e) determining for each of the plurality of routes a metric function of the output length for each pair of consecutive nodes in each of the plurality of routes, the predetermined crossing value for each node in each of the plurality of routes; and (f) selecting a route of said plurality of routes that has the smallest metric function.

2. The method of claim 1 wherein the step of determining a metric function includes determining the metric function using the formula $$M = \sum_{i=1}^{N} [L_i + D_i(1 + V_i)].$$

3. The method of claim 1 wherein the method further comprises the steps of:

(g) identifying a first zone in which the material transport vehicle is located;

(h) identifying a second zone in which the destination node is located;

(i) in the event that the material transport vehicle and the destination node are not within the same zone, identifying at least one unfilled move request within the first zone, identifying a second material transport vehicle within the second zone to fulfill the move request.

4. The method of claim 1 further comprising the steps of:

(j) moving the vehicle to an intermediate node;

(k) selecting a new route by repeating steps (a)–(f).

5. A system for dynamically routing a material transport vehicle within a material transport system network having a plurality of nodes, the system comprising:

a controller;

a first database containing a plurality of topological data describing a material transportation network coupled to the controller;

a second database containing node-to-node distance values for each pair of adjacent nodes in the material transport system network, the second database coupled to the controller;

a third database containing node crossing values for each node in the material transport system network, the third database coupled to the controller;

a plurality of node controllers, each node controller associated with a corresponding node, each of the plurality of node controllers coupled to the controller and operative to provide queue size data indicative of the number of material transport vehicles at the corresponding node;

said controller operative to:

determine for each of the plurality of routes each of the intermediate nodes and the order of the intermediate nodes;

to read for each pair of consecutive nodes in each of the plurality of routes the corresponding node-to-node distance stored in said second database;

to read for each node in each of the plurality of routes, the predetermined node crossing value stored in the third database;

to receive for each node in each of the plurality of routes, the size of the queue of vehicles at each node from the corresponding node controller;

to determine for each of the plurality of routes a metric function value having parameters that include the node-to-node distance for each pair of consecutive nodes in each of the plurality of routes, the predetermined crossing value for each node in each of the plurality of routes, and the size of the queue of vehicles at each node; and to select a route of said plurality of routes that has the smallest metric function value.

6. The system of claim 5 wherein the metric function.

$$M = \sum_{i=1}^{N} [L_i + D_i(1 + V_i)].$$

7. The computer program product of claim 6 wherein the metric function is.

$$M = \sum_{i=1}^{N} [L_i + D_i(1 + V_i)].$$

8. A computer program product including a computer readable medium, said computer readable medium having a computer program stored thereon, said computer program for execution in a processor within a controller within a material transportation network, said computer program comprising:

program code for determining for each of the plurality of routes each of the intermediate nodes and the order of the intermediate nodes;

program code for receiving for each pair of consecutive nodes for each of the plurality of routes a predetermined output length for each pair of consecutive intermediate nodes;

program code for receiving for each node for each of the plurality of routes, a predetermined node crossing value;

program code for receiving for each node for each of the plurality of routes, the size of the queue of vehicles at each node for each of the plurality of routes program code for determining for each of the plurality of routes a metric function value of the output length for each pair of consecutive nodes in each of the plurality of routes, the predetermined crossing value for each node in each of the plurality of routes; and program code for selecting a route of said plurality of routes that has the smallest metric function.

* * * * *

UNITED STATES PATENT AND TRADEMARK OFFICE
CERTIFICATE OF CORRECTION

PATENT NO.   : 6,285,951 B1
DATED         : September 4, 2001
INVENTOR(S)  : Robert Gaskins et al.

It is certified that error appears in the above-identified patent and that said Letters Patent is hereby corrected as shown below:

<u>Column 7,</u>
Line 19, "function." should read -- function is --.

Signed and Sealed this

Twenty-first Day of June, 2005

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,285,951 B1 | |
| APPLICATION NO. | : 09/608470 | |
| DATED | : September 4, 2001 | |
| INVENTOR(S) | : Robert Gaskins et al. | |

It is certified that error appears in the above-identified patent and that said Letters Patent is hereby corrected as shown below:

Columns 7 and 8, beginning at line 25, please delete claims 7 and 8 and insert the following:

--7. A computer program product including a computer readable medium, said computer readable medium having a computer program stored thereon, said computer program for execution in a processor within a controller within a material transportation network, said computer program comprising:
program code for determining for each of the plurality of routes each of the intermediate nodes and the order of the intermediate nodes;
program code for receiving for each pair of consecutive nodes for each of the plurality of routes a predetermined output length for each pair of consecutive intermediate nodes;
program code for receiving for each node for each of the plurality of routes, a predetermined node crossing value;
program code for receiving for each node for each of the plurality of routes, the size of the queue of vehicles at each node for each of the plurality of routes
program code for determining for each of the plurality of routes a metric function value of the output length for each pair of consecutive nodes in each of the plurality of routes, the predetermined crossing value for each node in each of the plurality of routes; and
program code for selecting a route of said plurality of routes that has the smallest metric function.
8. The computer program product of claim 7 wherein the metric function is $M = \sum_{i=1}^{N}[L_i + D_i(1+V_i)]$. --

Signed and Sealed this

First Day of January, 2008

JON W. DUDAS
*Director of the United States Patent and Trademark Office*